United States Patent
Chan et al.

(10) Patent No.: US 7,478,004 B2
(45) Date of Patent: Jan. 13, 2009

(54) METHOD FOR TESTING A CONNECTION BETWEEN AN AUDIO RECEIVING DEVICE AND A MOTHERBOARD

(75) Inventors: Hoi Chan, Guangdong (CN); Qing-Long Chai, Guangdong (CN); De-Hua Dang, Guangdong (CN); Hong-Bo Zhao, Guangdong (CN); Li-Chuan Qiu, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 249 days.

(21) Appl. No.: 11/308,402

(22) Filed: Mar. 21, 2006

(65) Prior Publication Data
US 2006/0269260 A1 Nov. 30, 2006

(30) Foreign Application Priority Data
May 24, 2005 (CN) .......................... 2005 1 0034862

(51) Int. Cl.
*G01R 31/00* (2006.01)
*G06F 19/00* (2006.01)
(52) U.S. Cl. ..................... 702/120; 702/121; 702/122; 702/123; 714/736
(58) Field of Classification Search ............ 702/75–77, 702/121–124, 188–190; 713/736
See application file for complete search history.

(56) References Cited

U.S. PATENT DOCUMENTS

| 6,442,712 B1 * | 8/2002 | Jeon ............................ 714/43 |
| 6,956,387 B2 | 10/2005 | Ho et al. |
| 2005/0071109 A1 * | 3/2005 | DeFelice et al. ............ 702/120 |
| 2005/0110651 A1 * | 5/2005 | Martis et al. ........... 340/825.69 |

* cited by examiner

*Primary Examiner*—Eliseo Ramos Feliciano
*Assistant Examiner*—Phuong Huynh
(74) *Attorney, Agent, or Firm*—Winston Hsu

(57) ABSTRACT

A method for testing a connection between an audio receiving device and a motherboard is disclosed. The method includes the steps of: preparing a data storage medium containing an original audio data file; playing the data storage medium on an audio playing device with audio signals generated thereof, the audio playing device being connected to the audio receiving device; receiving the audio signals by the audio receiving device; transmitting the audio signals to the motherboard via the connection between the audio receiving device and the motherboard; outputting the audio signals from an output port; receiving the audio signals by an input port; recording the audio signals as a recorded audio data file; comparing the two audio data file; and reporting a test result indicating that the connection is in good condition if the two audio data files are identical.

9 Claims, 2 Drawing Sheets

METHOD FOR TESTING A CONNECTION BETWEEN AN AUDIO RECEIVING DEVICE AND A MOTHERBOARD

FIELD OF THE INVENTION

The present invention is generally related to methods for testing an audio device, and more particularly, is related to a method for testing a connection between an audio device and a computer.

DESCRIPTION OF RELATED ART

Nowadays, not only may a computer assist humans on data processing, but may also be used as an entertainment system playing music or other forms of multi-media. During assembly, a computer may be installed with a plurality of various audio devices while it is in the assembly plant. Before the computer is shipped to a customer or a computer retailer, the computer should pass a series of tests to make sure that the computer works normally.

One of these tests is the audio test. The purpose of an audio test is to test functions of audio devices installed in a computer. Typically, the audio test executes an audio file or a multi-media disk on an audio device installed in the computer while a test engineer listens to the audio device with an earphone to determine if the audio device is in working condition.

The above mentioned test practice has many disadvantages. For example, each computer needs to be assigned with a test engineer to monitor the test, increasing the production cost of the computer assembly factory for each engineer hired. Furthermore, the determining factor of the audio device test result lies significantly on the test engineer's ears. The combination of the test engineer's hearing condition, surrounding sound pollution, earphone quality creates an inconsistent quality of the test environment.

Some other test methods may partially overcome the advantages described above. Recent patents or applications in the art include China patent application No. 02159937.8, entitled "Method for testing a compact disk player associated to a computer automatically" and published on Jul. 14, 2004. The patent application discloses a method for automatically testing a compact disk player associated to a computer rather than utilizing a test engineer applying the basic ear test.

However, the above methods or solutions do not apply to other primary audio test purpose, that is, to test a connection between an audio receiving device and a computer.

What is needed, therefore, is a method for testing a connection between an audio receiving device and a computer automatically.

SUMMARY OF THE INVENTION

One embodiment of a computer-based method for testing a connection between an audio receiving device and a motherboard can be implemented as described herein. The motherboard has an input port and an output port. The method includes the steps of: preparing a data storage medium that stores an original audio data file; playing the medium on an audio playing device with audio signals generated thereof, the audio playing device being connected to the audio receiving device thereto receiving the audio signals by the audio receiving device; transmitting the audio signals to the motherboard via the connection between the audio receiving device and the motherboard; outputting the audio signals from the output port; receiving the audio signals at the input port; recording the audio signals as a recorded audio data file that is in the same data format as the original audio data file; comparing the original audio data file with the recorded audio data file; and reporting a test result indicating that the connection between the audio receiving device and the motherboard is in good condition if the two audio data files are identical.

Other systems, methods, features, and advantages of the present invention will be or become apparent to one with skill in the art upon examination of the following drawings and detailed description.

DETAILED DESCRIPTION

Figure 1:
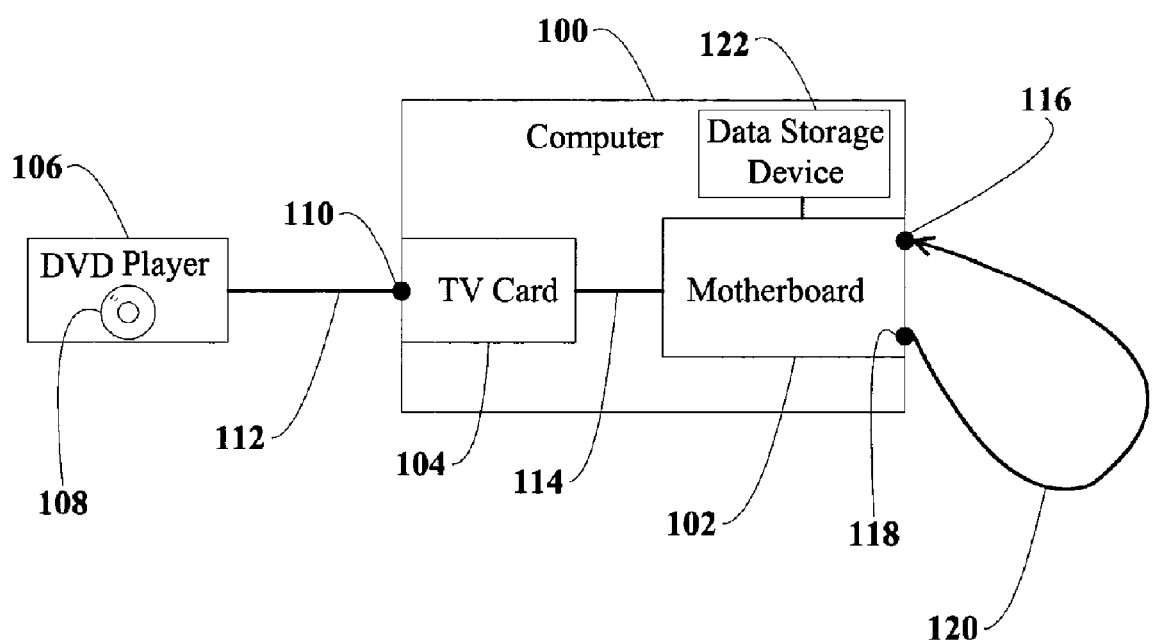
FIG. 1 is a schematic diagram illustrating hardware configuration of a method for testing a connection between an audio receiving device and a motherboard of a computer, in accordance with one embodiment.

FIG. 1 is a schematic diagram illustrating hardware configuration of a method for testing a connection between an audio receiving device and a motherboard of a computer in accordance with one preferred embodiment. The hardware configuration mainly includes a computer 100 and an audio playing device, such as a digital video disk (DVD) player 106. The audio playing device can also be, but not restricted to a compact disk read only memory drive (CD-ROM) or a digital video disk read only memory drive (DVD-ROM). The DVD player 106 may have a data storage medium therein, such as a DVD 108, which stores audio and/or video data. The data storage medium can also consist of a compact disk (CD) or a video compact disk (VCD).

The computer 100 mainly includes a motherboard 102 and a data storage device 122 associated to the motherboard 102. The motherboard provides an input port such as a microphone-in port 116, and an output port such as a headphone-out port 118. The microphone-in port 116 and the headphone-out port 118 are connected via a conductor 120 which can conduct audio signals. The conductor 120 can be an electricity conductor, an optic fiber cable or other medium that can transmit audio signals. The computer 100 also includes other components, such as a central processing unit (CPU), a memory, which are essential to normal operation of the computer 100. However, these components are not shown in order to simplify the illustrated the embodiment. The computer 100 further has an audio receiving device such as a television tuner card (TV Card) 104 associated to the motherboard 102 via a connection 114. The TV Card 104 provides an S-Video port 110, by which the DVD player 106 can connect to the TV Card 104 via a conductor 112. The embodiment can test if the connection 114 is in good condition for transmitting audio signals between the TV Card 104 and the motherboard 102.

When playing the DVD 108 which stores audio data, the DVD player 106 generates audio signals according to the audio data. The audio signals are transmitted through the conductor 112, and received by the S-Video port 110 of the TV Card 104. The TV Card 104 transmits the audio signals to the motherboard 102 via the connection 114. The audio signals are output from the headphone out port 118, and received by the microphone in port 116 via the conductor 120. The audio signals are recorded as a recorded audio data file that is stored in the data storage device 122.

The computer 10 may further run software for analyzing the recorded audio data file, in order to determine if the connection 114 is in good condition for transmitting audio signals between the TV Card 104 and the motherboard 102. The software is hereinafter referred to as "the test software".

Figure 2:
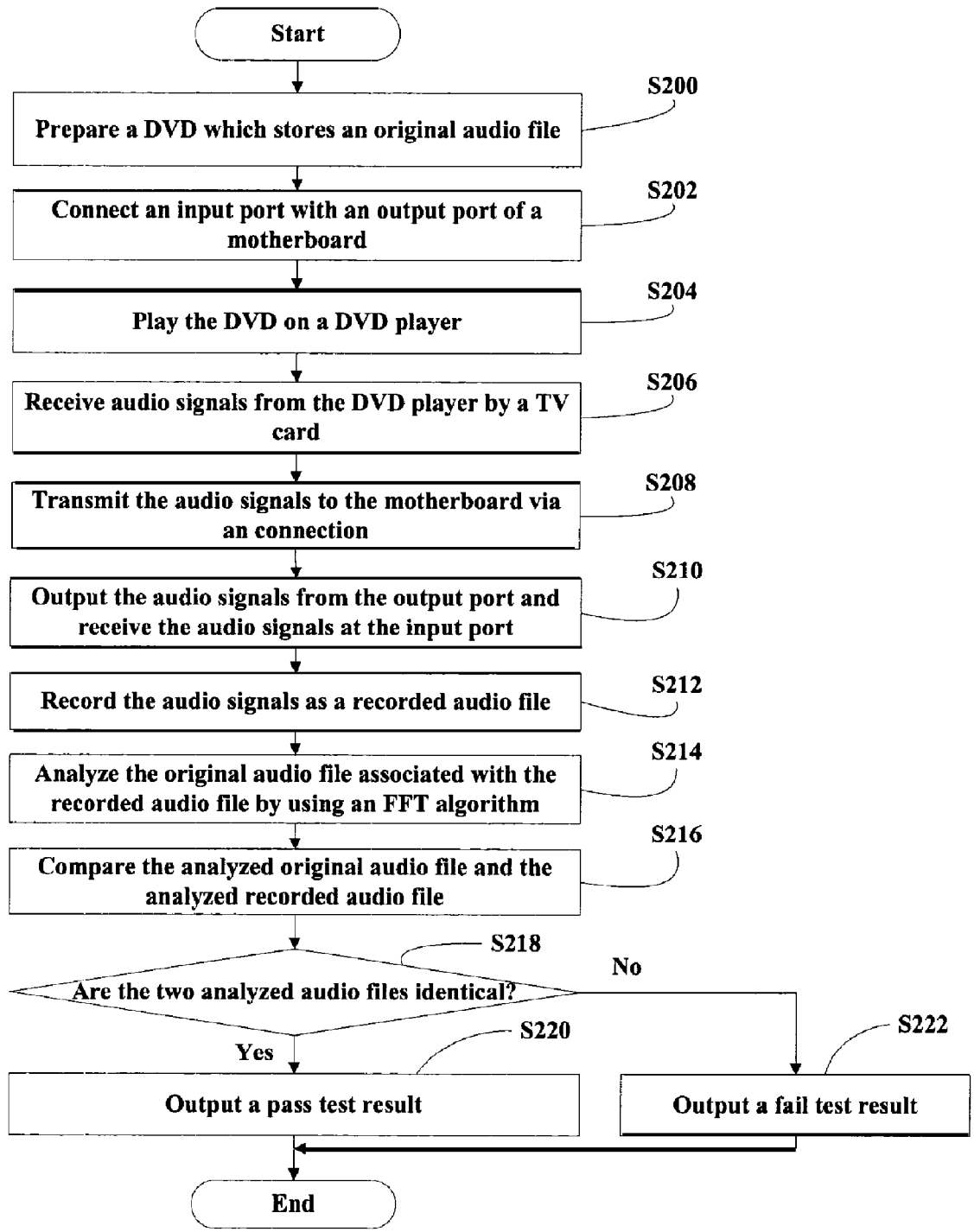
FIG. 2 is a flowchart of a preferred method for testing a connection between an audio receiving device and a motherboard of a computer, in accordance with one embodiment.

FIG. 2 is a flowchart of a preferred method for testing the connection 114 between an audio receiving device (such as the TV Card 104) and the motherboard 102 of the computer 100. In step S200, a DVD 108 is prepared by a test engineer. The DVD 108 contains at least one audio data file. The original audio data file may be in any format which can be played on the DVD player 106, such as a wave format, or an MPEG-1 Audio Layer3 (MP3) format. The original audio data file consists of a music file stored in a compact disk (CD) or a digital video disk (DVD), and may be generated by using a music composing tool that can compose music on a computer. In step S202, the test engineer connects the microphone-in port 116 and the headphone-out port 118 through the conductor 120 that can transmit audio signals therein. In step S204, the DVD player 106 plays the DVD 108 and generates audio signals according to the original audio data file in the DVD 108.

In step S206, the audio signals are transmitted through the conductor 112 and received by the S-Video port 110 of the TV Card 104. In step S208, the TV Card 104 transmits the audio signals to the motherboard 102 via the connection 114 between the TV Card 104 and the motherboard 102. In step S210, the audio signals are output from the headphone-out port 118, and received by the microphone-in port 116 via the conductor 120. In step S212, the computer 100 records the audio signals as a recorded audio data file in the data storage device 122. It should be noted that the original audio data file and the recorded audio data file are in the same format, such as the MP3 format or the wave format.

In step S214, the computer 100 analyzes the original audio data file and the recorded audio data file by using a Fast Fourier Transform Algorithm. In step S216, the computer 100 compares the analyzed original audio data file with the analyzed recorded audio data file. In step S218, the test software determines if the two analyzed audio data files are identical.

If the two analyzed audio data files are identical, in step S220, the computer 100 reports a test result indicating that the connection 114 between the TV Card 104 and the motherboard 102 is in good condition. Otherwise, if the two analyzed audio data files are not identical, in step S222, the computer 100 reports a test result indicating that the connection 114 between the TV Card 104 and the motherboard 102 is in bad condition.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A computer-based method for testing a connection between an audio receiving device and a motherboard, the method comprising the steps of:
   providing a computer, the computer including a motherboard and an audio receiving device installed therein, the motherboard including an input port and an output port;
   preparing a data storage medium containing an audio data file viewed as an original audio data file;
   playing the data storage medium on an audio playing device so that the audio playing device generates corresponding audio signals, the audio playing device being connected to the audio receiving device;
   receiving the audio signals by the audio receiving device;
   transmitting the audio signals to the motherboard via the connection between the audio receiving device and the motherboard;
   outputting the audio signals from the output port;
   receiving the audio signals by the input port;
   recording the audio signals as a recorded audio data file that is in the same format as the original audio data file;
   comparing the original audio data file with the recorded audio data file; and
   reporting a test result indicating that the connection between the audio receiving device and the motherboard is in good condition if the two audio data files are identical.

2. The method according to claim 1, further comprising the step of analyzing the original audio data file and the recorded audio data file by using a Fast Fourier Transform Algorithm before the comparing step.

3. The method according to claim 1, further comprising the step of reporting a test result indicating that the connection between the audio receiving device and the motherboard is in bad condition if the two audio data files are not identical.

4. The method according to claim 1, wherein the data storage medium is a compact disk.

5. The method according to claim 1, wherein the data storage medium is a video compact disk.

6. The method according to claim 1, wherein the data storage medium is a digital video disk.

7. The method according to claim 1, wherein the audio playing device is a digital video disk player.

8. The method according to claim 1, wherein the audio playing device is a digital video disk read only memory drive.

9. The method according to claim 1, wherein the audio receiving device is a television tuner card.

\* \* \* \* \*